June 5, 1923.
J. W. FLOWER
FILTRATION CHAMBER
Filed Nov. 12, 1921
1,457,514
2 Sheets-Sheet 1
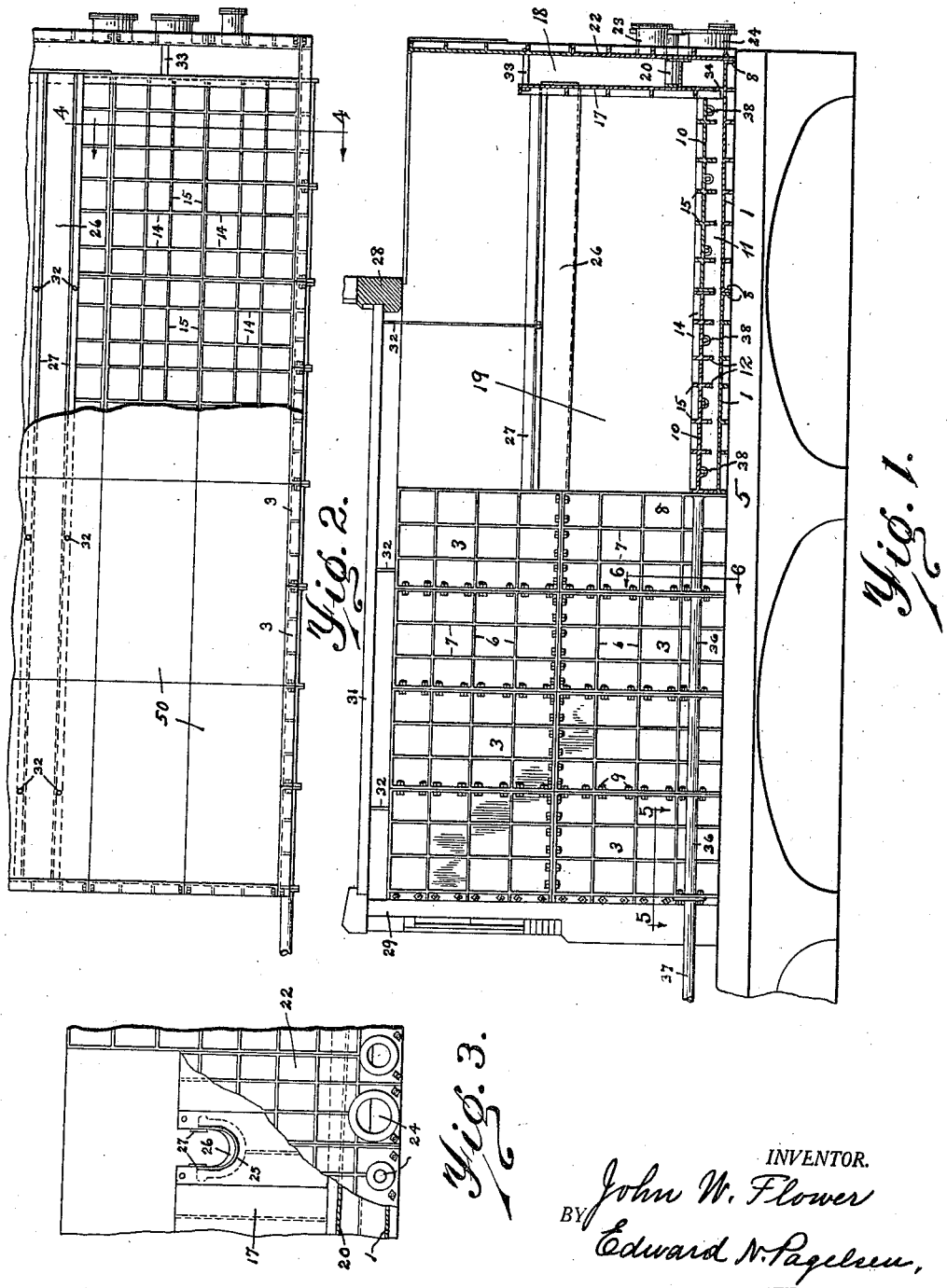
INVENTOR.
John W. Flower
BY Edward N. Pagelsen,
ATTORNEY.

June 5, 1923.
J. W. FLOWER
FILTRATION CHAMBER
Filed Nov. 12, 1921
1,457,514
2 Sheets-Sheet 2
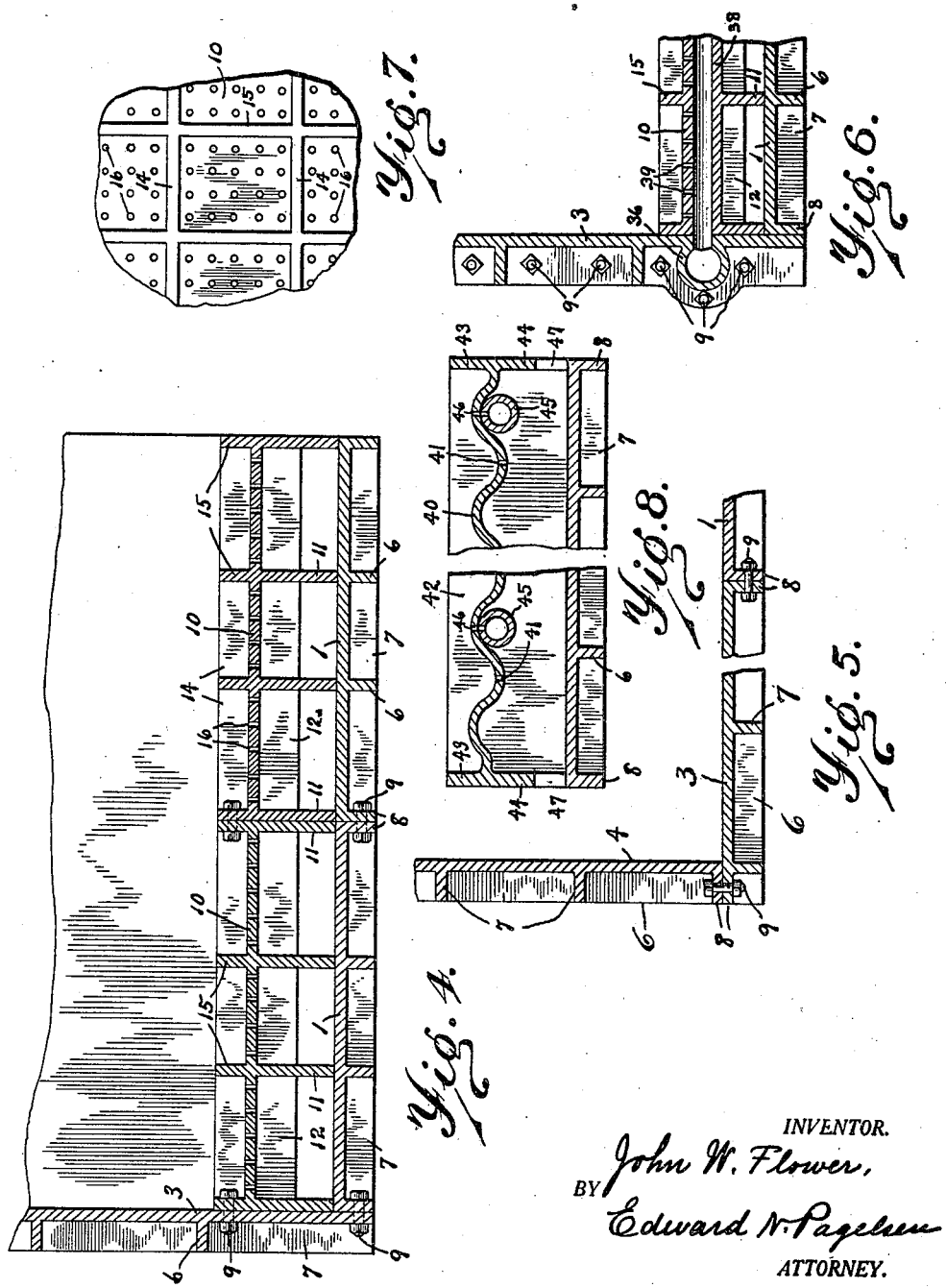
INVENTOR.
John W. Flower,
BY Edward N. Pagelsen
ATTORNEY.

Patented June 5, 1923.

1,457,514

UNITED STATES PATENT OFFICE.

JOHN W. FLOWER, OF DETROIT, MICHIGAN, ASSIGNOR, BY MESNE ASSIGNMENTS, TO MICHIGAN VALVE FOUNDRY AND ENGINEERING COMPANY, OF DETROIT, MICHIGAN, A CORPORATION OF MICHIGAN.

FILTRATION CHAMBER.

Application filed November 12, 1921. Serial No. 514,771.

*To all whom it may concern:*

Be it known that I, JOHN W. FLOWER, a citizen of the United States, and residing at Detroit, in the county of Wayne and State of Michigan, have invented a new and Improved Filtration Chamber, of which the following is a specification.

This invention relates to the construction of filtration plants and particularly to the construction of the individual units designed to purify the water used for domestic and industrial purposes, and its object is to provide a simple, readily assembled and complete unit which can be constructed at minimum cost.

This invention consists in a filter chamber built up of panels having their inner faces coated with enamel by fusing it thereon, and a false bottom also formed of panels and provided with many small holes to permit the passage of water.

It also consists in forming the false bottom with downwardly extending ribs separated by passages through which the water may flow to an outlet chamber.

It also consists in a filtration unit of this character provided with an auxiliary chamber divided by a longitudinal wall into upper and lower portions, the water passages beneath the false bottom of the filter chamber connecting to the lower portion of the auxiliary chamber.

It also consists in an air main along a side wall of the filtration unit and secondary pipes extending along the false bottom and having perforations to direct the air into the filter material in the filter chamber.

It further consists in the details of construction illustrated in the accompanying drawings and particularly pointed out in the claims.

In the accompanying drawings, Fig. 1 is a side elevation of this improved filtration chamber with a portion of a side wall omitted. Fig. 2 is a plan of one side thereof, a portion of the cover being broken away. Fig. 3 is a partial end elevation, a portion of the outer wall being broken away. Fig. 4 is a section on the line 4—4 of Fig. 2 on a larger scale. Figs. 5 and 6 are sections on the lines 5—5 and 6—6 of Fig. 1 respectively on a larger scale. Fig. 7 is a plan of a portion of false bottom. Fig. 8 is a section showing a modified construction of false bottom.

Similar reference characters refer to like parts throughout the several views.

The units of filtration plants are usually constructed of stone, brick or concrete, all of which are difficult to clean after becoming coated with slime and other filth. The present unit is constructed of cast iron panels, shown to have longitudinal and transverse stiffening ribs and having their inner surfaces enameled so that the tendency to become coated is reduced to a minimum and so that these surfaces can be cleaned at a minimum expense. The edges of these metal panels may be readily machined and the flanges along these edges drilled so that the panels can be bolted together with simple packing strips between them and water-tight joints thus secured. As these panels can all be of the same size for any particular plant, very few variations of construction are necessary.

The bottom panels 1 and 2 are attached to the side panels 3 and rear end panels 4 by means of bolts, and the bottom panels rest on the base 5 which may be of masonry, concrete or any other desirable construction. All the outside panels, including the bottoms, are preferably provided with stiffening ribs 6 and 7 and edge ribs 8 through which the bolts 9 extend, which bolts unite the panels into a water-tight structure. As shown in Figs. 4 and 6, a false bottom rests on the bottom panels and consists of panels 10 having deep ribs 11 and shallower ribs 12 which permit free-flow of water between the ribs 11, the panels being so positioned that these ribs 11 are at right angles to the outlet chamber.

The false-bottom panels 10 are preferably also provided with ribs 14 and 15 on their upper sides and with holes 16 to permit the passage of the liquid to be filtered. A partition 17 is also formed of similar panels and divides the water chamber 18 from the filter chamber 19. A flanged plate 20 extends between this partition and the outer wall 22 of the water chamber and divides the water chamber into upper and lower sections. Connections 23 and 24 for the liquid to be filtered are attached to the wall 22, some above and the others below this dividing plate 20. As shown in Fig. 1, the bottom panels 1 may be extended to connect to this partition 22.

Extending longitudinally of the filter chamber 19 and resting in a notch 25 in the partition 17 is a trough 26 which is preferably provided with adjustable side plates 27 whose upper edges are in the same horizontal plane. A heavy beam 28 and an end wall 29 may support the longitudinal bars 31 from which depend the rods 32 which support the intermediate portion of this trough. Any other desired means may be employed to support the trough. While but one trough is shown, it will be understood that any desired number may be employed. The upper edges of the side plates 27 of this trough are lower than the upper edges of the sides of the filter chamber, the water chamber and the partition between them. Stay bolts 33 may be used between the upper edge of the partition 17 and the outer wall 22.

Water or other liquid enters the upper part of the water chamber 18 through the connections 23 and after filling it, flows along the trough 26 and evenly over its edges to the filter bed in the chamber 19. After passing through this filter bed it reaches the holes 16 in the false bottom through which it flows to the spaces between the ribs 11 and then passes through the openings 34 in the bottom of the partition 17 to the lower part of the water chamber 18 and out through the connections 24. This flow may be reversed to scour the filter bed.

It is sometimes desirable to pass air through the filter bed, so I prefer to form side panels 3 with air mains 36 to which a supply pipe 37 may connect. The panels 10 of the false bottom may be formed with transverse pipes 38 having holes 39 in their upper sides. These pipes 39 may be so close together as to insure perfect aeration of the bed. Cover plates 50 may be used if desired, as shown in Fig. 2.

In Fig. 8 is shown another construction of false bottom, which consists of panels having corrugated plates 40 provided with holes 41, longitudinal ribs 42, edge ribs 43 and 44 and transverse air pipes 45 having discharge openings 46. The water can flow through the openings 47 in the ribs 44. These panels connect to the panels of the sides in the same manner as the flat floor panels shown in Fig. 6.

As all the different parts of this filtration unit can be machined accurately and be properly drilled for connecting bolts after being enameled, perfect connections are easily made and the cost of such a unit is much less than one of the same size of concrete or other masonry.

The details and proportions of the several parts may all be changed by those skilled in the art without departing from the spirit of my invention as set forth in the following claims.

I claim:—

1. In a filtration unit, the combination of a series of rectangular panels secured together to form a rectangular filter chamber, an adjoining water chamber and a partition between them, a false bottom formed of panels to support the filter material in said filter chamber, said false-bottom panels consisting of perforated plates and downwardly extending ribs, the ribs parallel to the partition being of less depth than the others so as to leave channels for water, the partition being apertured at the ends of said channels.

2. In a filtration unit, the combination of a series of rectangular panels secured together to form a rectangular filter chamber, an adjoining water chamber and a partition between them, a false bottom formed of panels to support the filter material in said filter chamber, said false-bottom panels consisting of perforated plates and downwardly extending ribs, the ribs parallel to the partition being of less depth than the others so as to leave channels for water, the partition being apertured at the ends of said channels, and air conduits extending below the false bottom.

3. In a filtration unit, the combination of a series of rectangular panels secured together to form a rectangular filter chamber, an adjoining water chamber and a partition between them, a false bottom formed of panels to support the filter material in said filter chamber, said false-bottom panels consisting of perforated plates and downwardly extending ribs, the ribs parallel to the partition being of less depth than the others so as to leave channels for water, the partition being apertured at the ends of said channels, the inner surfaces of the panels being enameled.

4. In a filtration unit, the combination of a series of rectangular panels secured together to form the sides, ends and bottom of a rectangular filter chamber and of an adjoining water chamber and of the partition between them, a perforated false bottom in the filter chamber, said partition having openings below said false bottom, a separating plate in the water chamber dividing it into upper and lower parts, the outer wall of the water chamber being formed with openings above and below said plate.

5. In a filtration unit, the combination of a series of rectangular panels secured together to form the sides, ends and bottom of a rectangular filter chamber and of an adjoining water chamber and of the partition between them, a perforated false bottom in the filter chamber, said partition having openings below said false bottom, a separating plate in the water chamber dividing it into upper and lower parts, the outer wall of the water chamber being formed with openings above and below said plate, and a trough extending from the water chamber across the filter chamber to deliver water thereto.

6. In a filtration unit, the combination of a series of rectangular panels secured together to form the sides, ends and bottom of a rectangular filter chamber and of an adjoining water chamber and of the partition between them, a perforated false bottom in the filter chamber, said partition having openings below said false bottom, a separating plate in the water chamber dividing it into upper and lower parts, the outer wall of the water chamber being formed with openings above and below said plate, and a trough extending from the water chamber across the filter chamber to deliver water thereto, the edges of the trough consisting of vertically adjustable plates.

7. In a filtration unit, the combination of a rectangular chamber having its bottom and sides formed of panels, a false bottom in said chamber consisting of perforated plates, an air main consisting of sections constituting portions of the panels of one of the sides of the chamber, and distributing pipes extending transversely to said air main beneath said perforated plates.

8. In a filtration unit, the combination of a series of rectangular panels secured together to form the sides, ends and bottom of a rectangular filter chamber and of an adjoining water chamber and of the partition between them, a perforated false bottom in the filter chamber, said partition having openings below said false bottom, a separating plate in the water chamber dividing it into upper and lower parts, the outer wall of the water chamber being formed with openings above and below said plate, said panels consisting of plates and reinforcing ribs attached thereto at the edges of the plates and parallel to said edges.

JOHN W. FLOWER.